(12) United States Patent
Danielsson et al.

(10) Patent No.: US 12,136,224 B2
(45) Date of Patent: Nov. 5, 2024

(54) SEGMENTATION METHOD

(71) Applicant: Axis AB, Lund (SE)

(72) Inventors: Niclas Danielsson, Lund (SE); Xing Danielsson Fan, Lund (SE); Axel Keskikangas, Lund (SE)

(73) Assignee: AXIS AB, Lund (SE)

( * ) Notice: Subject to any disclaimer, the term of this patent is extended or adjusted under 35 U.S.C. 154(b) by 349 days.

(21) Appl. No.: 17/864,400

(22) Filed: Jul. 14, 2022

(65) Prior Publication Data

US 2023/0086993 A1    Mar. 23, 2023

(30) Foreign Application Priority Data

Sep. 22, 2021  (EP) .................................... 21198349

(51) Int. Cl.
*G06K 9/34*  (2006.01)
*G06T 7/11*  (2017.01)
(Continued)

(52) U.S. Cl.
CPC ................ *G06T 7/136* (2017.01); *G06T 7/11* (2017.01); *G06V 10/82* (2022.01); *H04N 7/18* (2013.01)

(58) Field of Classification Search
CPC . G06T 7/136; G06T 7/11; G06T 2207/20021; G06T 7/215; G06T 7/60;
(Continued)

(56) References Cited

U.S. PATENT DOCUMENTS

2009/0310822 A1   12/2009  Chang et al.
2011/0052003 A1   3/2011   Cobb et al.
(Continued)

FOREIGN PATENT DOCUMENTS

CN   108875732 A  *  11/2018   .......... G06K 9/3233
CN   110097568 A  *  8/2019    .......... G06K 9/6269
(Continued)

OTHER PUBLICATIONS

Tokmakov et al., "Learning to Segment Moving Objects", HAL Id: hal-01653720, Available Online At: https://hal.archives-ouvertes.fr/hal-01653720v2, Sep. 25, 2018, pp. 1-19.
(Continued)

*Primary Examiner* — Xin Jia
(74) *Attorney, Agent, or Firm* — XSENSUS LLP

(57) ABSTRACT

A method of generating a segmentation outcome which indicates individual instances of one or more object classes for an image in a sequence of images is disclosed. The method comprises: determining (501) a coherent region of the image; processing (502) the image to determine a tensor representing pixel-specific confidence scores; generating (503) a series of temporary segmentation masks for the coherent region, wherein each temporary segmentation mask is generated by interpreting the tensor with respect to a single object class using a different temporary confidence score threshold; evaluating (504) the series of temporary segmentation masks to determine if an object mask condition is met; depending on the outcome of the evaluation, setting (505) the temporary confidence score threshold as a final confidence score threshold for the pixels of the temporary segmentation mask, or setting (505) a default confidence score threshold as a final confidence score threshold for the coherent region; and generating (506) a final segmentation outcome for the image.

14 Claims, 3 Drawing Sheets

(51) Int. Cl.
  *G06T 7/136* (2017.01)
  *G06V 10/82* (2022.01)
  *H04N 7/18* (2006.01)
(58) Field of Classification Search
  CPC . G06T 2207/10016; G06T 2207/20081; G06T 2207/20084; G06T 2207/30212; G06T 2207/30232; G06T 7/174; G06V 10/82; G06V 10/454; G06V 10/764; H04N 7/18
  See application file for complete search history.

(56) References Cited

U.S. PATENT DOCUMENTS

| | | | |
|---|---|---|---|
| 2019/0057507 A1* | 2/2019 | El-Khamy | G06T 11/60 |
| 2020/0026928 A1 | 1/2020 | Rhodes et al. | |
| 2020/0074642 A1 | 3/2020 | Wilson et al. | |
| 2020/0097756 A1 | 3/2020 | Hashimoto et al. | |
| 2020/0250836 A1 | 8/2020 | Li | |
| 2020/0364509 A1* | 11/2020 | Weinzaepfel | G06F 18/214 |
| 2022/0237414 A1* | 7/2022 | Zhang | A01M 21/00 |

FOREIGN PATENT DOCUMENTS

| | | |
|---|---|---|
| CN | 110490043 A | 11/2019 |
| EP | 3553748 A1 | 10/2019 |
| KR | 10-2020-0067682 A | 6/2020 |

OTHER PUBLICATIONS

Son et al., "Multi-Object Tracking with Quadruplet Convolutional Neural Networks", 2017 IEEE Conference on Computer Vision and Pattern Recognition (CVPR), Jul. 21-26, 2017, pp. 5620-5629.

Brownlee, "A Gentle Introduction to Threshold-Moving for Imbalanced Classification", Machine Learning Mastery, Feb. 10, 2020, pp. 1-24.

* cited by examiner

SEGMENTATION METHOD

CROSS-REFERENCE TO RELATED APPLICATION

This application claims priority to European Patent Application No. 21198349.9 filed on Sep. 22, 2021, the entire disclosure of which is incorporated by reference herein.

TECHNICAL FIELD

The present invention relates to the field of segmentation, and in particular to a method of providing segmentation masks which indicate individual instances of one or more object classes for an image in a sequence of images.

BACKGROUND

Video monitoring of objects such as buildings, people, animals, roads, and vehicles, for security and other surveillance purposes is becoming increasingly common. However, there are limitations to what even a trained attentive viewer can extract as meaningful information from a video. As a result, the demand for surveillance systems which can detect objects for monitoring and surveillance purposes using computer surveillance technology continues to grow. Recently, deep learning has allowed more complex analysis of video feeds from distributed camera and cloud computing surveillance systems.

Deep learning is a type of machine learning that may involve training a model, usually referred to as a deep learning model. The deep learning model may be based on a set of algorithms that are designed to model abstractions in data by using a number of processing layers. The processing layers may be made up of non-linear transformations, and each processing layer may transform the data before passing the transformed data to a subsequent processing layer. The transformation of data may be performed by weights and bias of the processing layer. The processing layers may be fully connected. Deep learning models may include, as an example and not by way of limitation, neural networks and convolutional neural networks. Convolutional neural networks may be made of up a hierarchy of trainable filters, interleaved with non-linearities and pooling. Convolutional neural networks may be used in large-scale object recognition tasks.

A deep learning model may be trained in a supervised or unsupervised setting. In a supervised setting, the deep learning model is trained using labeled datasets to classify data or predict outcomes accurately. As input data are fed into the deep learning model, the model adjusts its weights until the model has been fitted appropriately, which occurs as part of a cross validation process. In an unsupervised setting, the deep learning model is trained using unlabeled datasets. From the unlabeled datasets, the deep-learning model discovers patterns that can be used to cluster data from the datasets into groups of data having common properties. Common clustering algorithms are hierarchical, k-means, and Gaussian mixture models. Thus, the deep learning model may be trained to learn representations of data.

With the development of deep learning, faster and more accurate recognition of objects in live video streams from camera networks is becoming available. One technique for such recognition is segmentation or image segmentation. The aim of segmentation is to label image regions according to what's being depicted. An image region that is determined to depict an object, or a collection of objects, forms a segmentation mask. A segmentation result or segmentation outcome for an image comprises one or more segmentation masks.

Common types of segmentation are semantic segmentation and instance segmentation. In semantic segmentation, every pixel that belongs to a same object class are segmented as one object and are thus part of one segmentation mask. For example, all pixels that are detected as human are segmented as one object and all pixels that are detected as car are segmented as another object. Instance segmentation, on the other hand, aims to detect every distinct object instance of an image. For example, each person in an image is segmented as an individual object and thus forms one segmentation mask. Another known type of segmentation is panoptic segmentation which can be described as a combination of semantic and instance segmentation. In panoptic segmentation, the aim is to semantically distinguish different objects as well as to detect separate instances of different object classes in an image.

The present application and the disclosed invention relate to segmentation techniques that aim to, at least, detect separate instances of one or more object classes in an image. Examples of such segmentation techniques include the mentioned instance segmentation and panoptic segmentation.

The task of segmentation may be performed using a deep learning model that is configured and trained to perform instance segmentation. The instance segmentation may be part of a panoptic segmentation process or an instance segmentation process. Seen on a general level, an input to such a deep learning model is image data of one or more images, such as surveillance video images, that is to be segmented and the output is a tensor that represents confidence scores for one or more object classes for the image data on a pixel level. In other words, the deep learning model determines, for every pixel, the probability of the pixel depicting an object of each of one or more object classes.

There exist many different deep learning networks that are suitable for being configured and trained into a deep learning model that performs instance segmentation and the detailed form of input and output, i.e. what format is required for the input image data and which format the output tensor has, can vary between these networks. It is also noted that while the term "tensor" is a suitable representation for the output of deep learning model as they are constructed today, other future terms for output from a deep learning model or other method or algorithm structures that are used for the purpose of providing instance segmentation should be seen as equivalents. In other words, in future applications of the present invention, a data structure that in some way represents confidence scores for one of more object classes for an image can fulfill the same purpose as the tensor discussed herein and should be seen as an equivalent to the tensor. The term tensor is thus interchangeable with future terms for data structures that represent confidence scores for object classes for the image.

The output from the deep learning model is interpreted, possibly together with results from additional deep learning models, to form a segmentation mask for the image, i.e. a mask formed by image regions labeled with at least their object class as detected by the deep learning model or models. One standard technique for the interpretation is thresholding in which the tensor output from the deep learning model that performs instance segmentation is interpreted by setting a confidence score threshold for each object class. The threshold sets the minimum confidence score that is required for a pixel to be interpreted as depicting a corresponding object class. Thresholding is a non-trivial task and there exist many ideas on how to best set the thresholds. In general, a too low threshold results in a noisy segmentation mask that includes many false object detections while a too high threshold results in a poor segmentation mask that fails to include positive object detections.

One thresholding technique is disclosed in patent application US 2009/0310822. The document discloses an object segmentation process where so called object prediction information, on a pixel level, is used for adjusting confidence score thresholds during segmentation. Examples of object prediction information are object motion information, object category information, environment information, object depth information, and interaction information. According to the prediction information, a pixel is preliminary determined as a predicted foreground pixel or a predicted background pixel. If it is supposed that the pixel is a foreground pixel, the threshold value of the pixel is decreased to raise the sensitivity of the segmentation procedure. Otherwise, the threshold value is increased to lower the sensitivity.

Even though there exist various solutions to the provide accurate segmentation masks, there is still a need for improved methods with respect to, for example, processing efficiency and precision.

SUMMARY OF THE INVENTION

An aim of the present invention is to provide an improved method of providing segmentation masks that indicate individual instances of one or more object classes with respect to processing speed and segmentation precision, i.e. the level of accuracy provided by a resulting segmentation mask. In other words, an aim is to provide a fast segmentation method that outputs high precision segmentation masks.

According to a first aspect, these and other objects are achieved, in full or at least in part, by a method defined by claim 1.

The invention is based on a realization that thresholding, i.e. tuning of the interpretation of the tensor output from the segmentation deep learning model, is advantageously focused to image areas that are likely to depict an object. These areas can be localized by identifying so called coherent regions. The thresholding is configured to fine-tune confidence score thresholds in the coherent regions to provide more precise object segmentation masks. Less processing can be spent on thresholding in remaining areas that are less likely to depict objects. Thus, potentially limited processing resources can be allocated efficiently by being spent on determining suitable confidence score thresholds for pixels in regions that are likely to comprise objects. The fine-tuning of the confidence score thresholds in coherent regions comprises generating segmentation masks using different confidence score thresholds and evaluating the generated segmentation masks with respect to one or more object mask conditions. Upon a positive outcome, an acceptable segmentation mask has been determined for an object of the object class that is currently evaluated, and the confidence score threshold of that segmentation mask is kept in a final segmentation outcome for the whole image. Thus, and in contrast to prior art, the present invention defines a method where a confidence score threshold is adjusted for all pixels in an image region, i.e. in a group of neighbouring pixels, instead of adjusting the threshold for individual pixels independent of each other. In other words, a plurality of segmentation masks is generated for a group of pixels, forming an image subregion, and the segmentation masks are evaluated as entities, in contrast to independent adjustment of the confidence score thresholds on a pixel-level. The proposed approach provides a segmentation process with a high precision to low processing cost thanks to the adjustment and evaluation of image subregions that are selected to have high chance of depicting an object, as indicated by the coherent region.

As used herein coherent region means a region, forming a subregion of the image, of contiguous pixels in the image. An identified coherent region corresponds to an area in the image that has moved by approximately the same amount and in the same direction. The coherent region may for example correspond to a moving object depicted in the video. A coherent region can also be referred to as a motion-connected area.

Coherent regions can be determined by comparing motion vectors for the image macroblocks to find pixel regions with similar movement. By assuming that a group of neighbouring motion vectors having a similar, i.e. approximately the same, direction and magnitude likely indicates that the corresponding pixels depicts a same object, the presence of such a motion vector group, herein referred to as a coherent region, is used as a guide to an image region where it should be likely to detect an object by the segmentation process. Other ways to find coherent regions in the image may be to localize object by image analysis or by using external sensors such as radar.

Going more into detail of the process of determining coherent regions from motion vectors, these vectors may be retrieved from an encoding process for the image. Motion vectors are determined during encoding of the image where an image is processed by an encoding algorithm in which motion vectors are determined for pixel groups. Once the motion vectors for an image have been determined, the motion vectors can be evaluated to determine one or more coherent regions. Alternatively, motion vectors can be determined as a separate process without being part of an encoding process. Simply put, motion vectors can be determined by searching a previously captured image for macroblocks, being pixel blocks of, e.g., 4×4 or 8×8 pixels, of a current image. If found, a motion vector is determined for the macroblock and the motion vectors defines how much and in which direction the macroblock has moved since the previously captured image. Motion vectors as such are a well-known concept that is used for the purpose of temporally encoding of video, which is part of various video compression standards such as H.264 and H.265.

The condition of having approximately the same direction can be defined as that the directions of the motion vectors, or a dominating part of the motion vectors, lie within a predetermined span, for example that a largest angle between any two motion vectors in a coherent region is below a predetermined threshold angle. The condition of having approximately the same magnitude can be defined as that the magnitudes of the motion vectors, or a dominating part of the motion vectors, lie within a predetermined span, for example that a largest magnitude different between any two motion vectors in a coherent region is below a predetermined threshold value. Which threshold value that is suitable depends on parameters such as the configuration and precision of the motion vector determination. Thus, the threshold value may differ between implementations.

The task of finding coherent regions by evaluating motion vectors should be seen as trivial and can be solved by, e.g., different known evaluation algorithms.

As used herein object mask condition is defined as a condition for a segmentation mask which indicates that the mask corresponds to a depicted object. Some non-limiting examples of such conditions are given by the dependent claims and include non-fragmented mask, merged segmentation masks, and smooth mask edge. Object mask conditions may be implementation-specific and can thus vary. For example, a segmentation method for images depicting a scene with mainly humans may implement an object mask condition that works especially well for humans, but perhaps not so well for other object classes, while a segmentation method for images depicting a scene with objects of varying classes may implement a mask condition that suits many different object classes. An evaluation of a segmentation mask against an object mask condition may consider only that segmentation mask or may consider other segmentation masks as well. For example, a segmentation mask may be evaluated to see whether it fulfills an object mask condition by comparing how the object mask condition is fulfilled by a corresponding segmentation mask in a previous and/or a following image.

As used herein segmentation outcome means the result of an interpretation of a tensor representing pixel-specific confidence scores. According to the present invention, a plurality of interpretation rounds of the tensor is performed with respect to pixels of a coherent region. Each interpretation round is represented by a temporary segmentation mask which is then evaluated before generating a segmentation mask that is to be part of a final segmentation outcome for the image. A temporary segmentation mask, as used herein, can be seen as a binary representation of an image area which indicates if a pixel is detected as depicting an object of a particular object class or not. A plurality of temporary segmentation masks can be formed for a same image region, or for overlapping image regions, but with respect to different object classes.

The step of processing the image to determine a tensor may comprise processing the image by a deep learning model that is configured and trained for determining, based on image data of the image, confidence scores on a pixel-level for one or more object classes. Deep learning models that are configured and trained for instance segmentation or for being part of a panoptic segmentation process are general examples of such deep learning models. Non-limiting examples of deep learning network that can be configured and trained to form a deep learning model suitable for the task of instance segmentation include YOLACT, Mask-R-CNN, Fully Convolutional Instance-aware semantic Segmentation techniques like FCIS, and the Panoptic-DeepLab panoptic segmentation model architecture. It is noted that even though embodiments of the invention are disclosed in a context of deep learning, which is a preferred embodiment at the filing date of this application, the present invention is not restricted to using a deep learning model for the instance segmentation. For example, another type of machine learning model or algorithm can be used instead of a deep learning model if it performs instance segmentation based on image data and provides an output representing confidence scores for an image.

The generation of the series of temporary segmentation masks can be seen as an iterative process in which the tensor is interpreted using a temporary confidence score threshold that is adjusted between iterations. The adjustment of the temporary confidence score threshold may follow a predetermined scheme, for example the adjustment may change the temporary confidence score threshold step-wise between a start value and an end value. The start and end values may form a threshold span. Thus, the iterative interpretation of the tensor may comprise always increasing or always decreasing the temporary confidence score thresholds between iterations. An advantage with this approach is that the evaluation of the series of temporary segmentation masks may comprise evaluating a trend in the series of temporary segmentation mask, for example that the mask is expanding, which may bring the evaluation quicker to a conclusion whether the object mask condition is or will be fulfilled or not.

The starting point of the confidence score threshold adjustment, i.e. the initial confidence score threshold of the first generated mask in the series of temporary segmentation masks, can be selected according to different embodiments. As mentioned, the temporary confidence score threshold can be adjusted between a start value and end value, thus between a maximum and a minimum value or vice versa. An alternative approach is to first generate a first temporary segmentation mask in the series using an initial confidence score threshold, for example the base confidence score threshold, and then evaluate a spatial relation between the first temporary segmentation mask and the coherent region. If the first temporary segmentation mask is smaller than the coherent region, then it is more likely that the first temporary segmentation mask does not cover all object pixels. A second temporary confidence score threshold can be determined to include more pixels compared to the initial confidence score threshold, wherein a second temporary segmentation mask is generated with the second confidence score threshold. On the contrary, if the first temporary segmentation mask is larger than the coherent region, then it is likely that the first temporary segmentation mask covers too many pixels. A second temporary confidence score threshold can be determined to include less pixels compared to the initial confidence score threshold, wherein a second temporary segmentation mask is generated with the second confidence score threshold. Accordingly, the selection of generating the series of temporary segmentation masks with an always increasing or always decreasing temporary confidence score threshold may be based on a comparison between the first temporary segmentation mask of the series and the coherent region.

The series of temporary segmentation masks is preferably generated by interpreting the tensor with respect to a single, optionally selected, object class. In other words, the temporary segmentation masks represent an object of a single object class according to the tensor as interpreted at different confidence score thresholds. The method may be performed in parallel for different object classes, wherein a final confidence score threshold for each object class may be determined. Before generating a final segmentation outcome, the segmentation process needs to choose which objects to include in the final segmentation outcome and which to discard. Such filtering is a known part of segmentation processes.

Which object class to select, if needed, when generating the series of temporary segmentation masks can be determined by analysing the tensor. A selection may be needed or desired to save time and/or processing resources. In one embodiment, the single object class is determined by identifying the object class having the highest sum of confidence scores for the pixels in the coherent region. Alternatively, the highest number of pixels being identified as a particular object class may set the single object class. Historic object classes determined for the coherent region may also be considered when determining the single object class. For example, if in a previous image an object class of horses has been determined for pixels in the coherent region, the determination of the single object class may be adjusted to be more prone to select the object class of horses. For example, a higher weight may be put on the confidence score of horses in the tensor compared to weights for other object classes. Alternatively, the confidence score threshold for the object class of horses may be offset to a lower value compared to confidence score thresholds for other object classes.

According to one embodiment, the series of temporary segmentation masks is generated for an image region consisting of the coherent region and a surrounding margin area. Thus, the series of temporary segmentation masks are generated for the coherent region and for, in addition, a relatively small surrounding margin area, however still not for the whole image. An advantage with this embodiment is that the temporary segmentation masks that are generated can extend outside the coherent region.

In one embodiment, the final confidence score is re-used in a subsequent segmentation process for a next image in the sequence of images. For example, the final confidence score may for a first image be used as an initial confidence score threshold, which is used for generating a first temporary segmentation mask, in a coherent region, of a second image, that is determined to correspond to a same object as a coherent region of the previous image. For this to work, the coherent region of the next, second, image need to be analysed to determine if it is caused by the same object as the coherent region of the first image. Moreover, a condition that the coherent region should have a similar, i.e. approximately the same, spatial position and size may also be implemented to assure that the coherent regions are caused by the same object. A multi-object tracking algorithm may aid the determination since objects can be tracked and identified relative each other. The result of the multi-object tracking algorithm can be used to verify that detected objects in the coherent regions of two subsequent images are the same or not.

Thus, according to a second aspect the invention is a method of generating segmentation masks which indicates individual instances of one or more object classes for images in a sequence of images, as defined by claim 9.

According to another embodiment, the final confidence score is re-used in a subsequent generation of a segmentation mask for a next image in the sequence of images even in the case where a coherent region is not identified in the next, second, image. The object may still be depicted in the second image, however it may be still, i.e. not moving, and thus not cause any coherent region. Thus, if there is a coherent region in a previous image, for example in any of 10 previous images, the final confidence score threshold may be used for the same pixels in the second image as in the previous image. With this approach, an improved mask of still object can be achieved with help of earlier generated segmentation masks of the same object when moving.

The method as disclosed herein may advantageously be performed in a processing device of a camera. The final segmentation outcome may in that case be transmitted by the camera together with the image in an encoded format.

According to a third aspect, the invention is an image capturing device configured to generate a segmentation mask which indicates individual instances of one or more object classes for an image in a sequence of images, as defined in claim 12. The image capturing device of the third aspect may generally be embodied in the same ways as the method of the first aspect with accompanying advantages.

According to a fourth aspect, the invention is a computer-readable storage medium comprising computer code which when loaded and executed by one or more processors or control circuitry causes the one or more processors or control circuitry to perform a method according to the first aspect.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
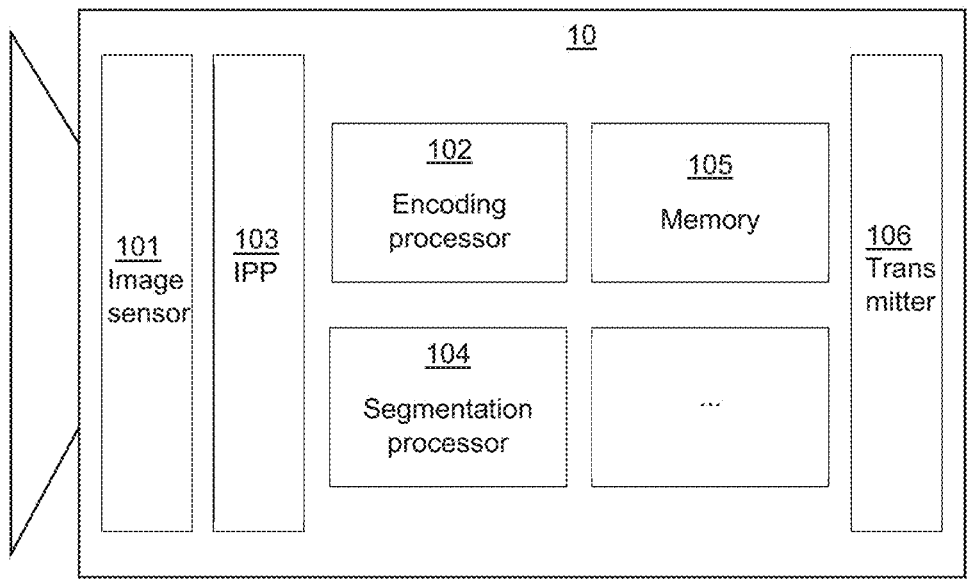
FIG. 1 illustrates modules of a camera according to an embodiment of the invention.

FIG. 1 illustrates a camera 10 with a configuration that is suitable for performing a method of generating a segmentation mask for an acquired image according to an embodiment. The camera 10 is a digital camera that may be adapted for monitoring purposes. The camera 10 may for example be a fixed surveillance camera configured to generate video of a scene that is viewed by a user located remotely. The camera 10 comprises an image sensor 101 for acquiring images according to known digital imaging techniques and a transmitter 106 for transmitting video, i.e. one or more image sequences, via wired or wireless communication to a receiver. Before transmitting the video, the camera 10 adjusts and processes acquired image data thereof. An image processing pipeline (IPP) 103 performs known pre-encoding enhancement of acquired image data such as gain and white balance adjustments. An encoding processor 102 is provided for the purpose of encoding raw or pre-encoding processed image data. The encoding processor 102 is adapted to encode image data using a video compression algorithm based on predictive coding. Non-limiting examples of suitable video compression algorithms include the H.264 and H.265 video compression standards. Predictive coding, or temporally encoding, includes intra-frame (I-frame) coding and inter-frame (P- or B-frame) coding. During predictive coding, motion vectors are determined in a known manner, typically on a macroblock level. A motion vector represents the position of a macroblock in one image with reference to the position of the same or a similar macroblock in a previously acquired image. The macroblock size varies between different video compression standards. For example, a macroblock can be formed by a pixel group of 8×8 or 16×16 neighbouring pixels. The output from the encoding processor 102 is encoded image data.

The camera 10 further comprises a segmentation processor 104 configured to perform image segmentation that includes instance segmentation. In other words, the image segmentation processor 104 is adapted to process the image, more specifically raw or pre-encoding processed image data, to generate a segmentation mask which indicates individual instances of one or more object classes for a captured image. The segmentation may be performed for all or for selected images of an image sequence.

The image segmentation processor 104 and the encoding processor 104 may be implemented as software, wherein circuitry forms respective processors, for example microprocessors, which in association with computer code instructions stored on a memory 105 being a (non-transitory) computer-readable medium, such as a non-volatile memory, causes the camera 10 to carry out (part of) any method disclosed herein. Examples of non-volatile memory include read-only memory, flash memory, ferroelectric RAM, magnetic computer storage devices, optical discs, and the like.

The camera 10 may include further modules which fill other purposes not related to the present invention.

It is noted that the segmentation processor 104 is not required to be an integral part of the camera 10. In an alternative embodiment, the segmentation processor 104 is located remotely to the camera 10. Image segmentation may thus be performed remotely on, e.g., a server that is connected to the camera 10, wherein the camera 10 transmits image data to the server and may receive image segmentation result from the server.

Figure 2:
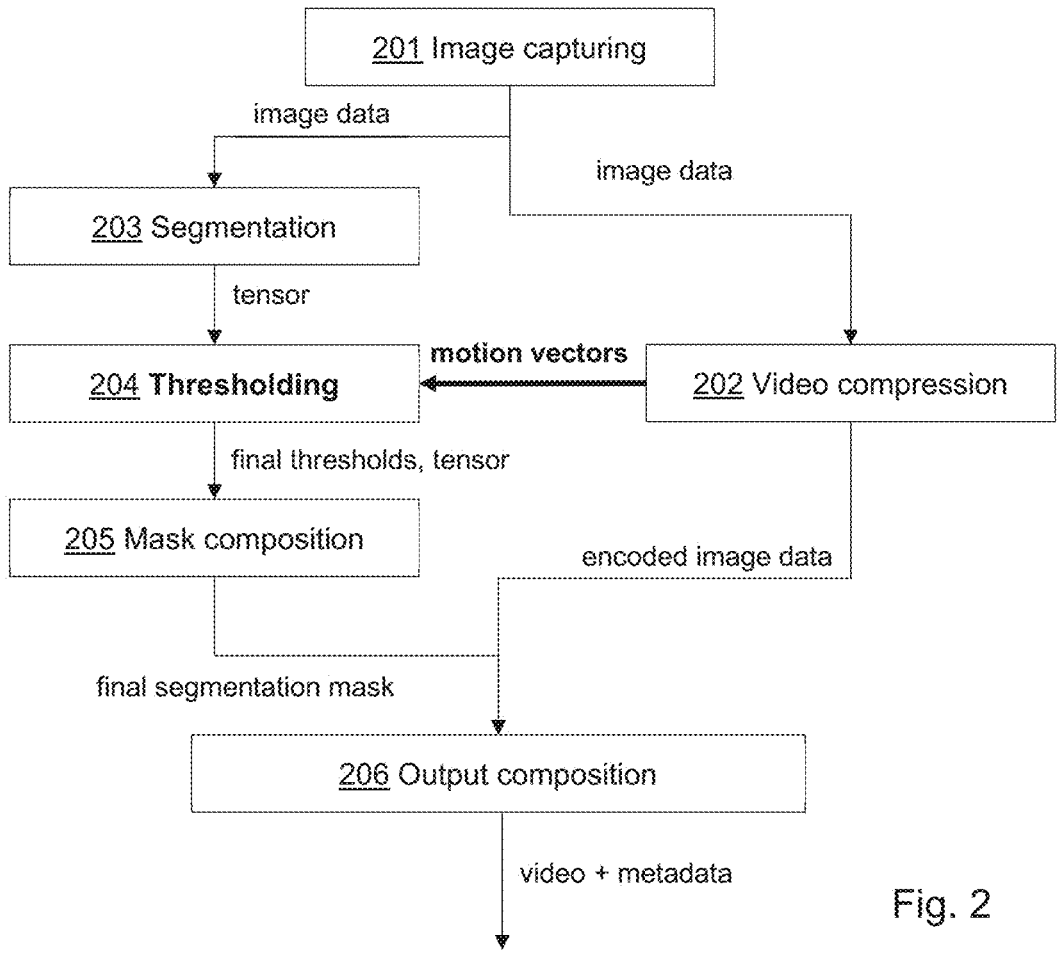
FIG. 2 is a flow chart providing an overview of the present invention according to one embodiment.

An overview of an embodiment will now be provided with further reference to FIG. 2. FIG. 2 illustrates a flow chart of the image processing in the camera 10 with respect to image segmentation and encoding, and the interaction therebetween according to an embodiment. By image capturing 201, image data is acquired and, optionally, pre-encoding processed. The image data is provided to the segmentation processor 104 for image segmentation and to the encoding processor 102. In the encoding processor 102, video compression 102 is performed together with other encoding steps which are not illustrated here. The video compression 102 comprises determining motion vectors as part of the predictive coding. For the purpose of the encoding, the motion vectors are used for representing an image sequence in a bit-efficient manner. In addition, according to the embodiment, the motion vectors are also used in the segmentation. Thus, motion vectors from the video compression 202 are extracted to the segmentation and in particular to a step of thresholding 204 in the segmentation. A purpose of the thresholding 204 is to determine confidence score thresholds to be used for generating a final segmentation outcome for an image. A confidence score threshold sets a boundary value between confidence scores that should be interpreted as a positive detection and confidence scores that should be interpreted as a negative detection. The confidence scores that are to be interpreted are given in a tensor that is output from a preceding segmentation 203. As discussed, the segmentation 203 comprises processing, in known manners, the image data to generate determine confidence scores. A confidence score is determined on a pixel level and may be a value between, for example, 1 and 100 that indicates the probability of a pixel depicting an object of a certain object class. The segmentation 203 may determine confidence scores for a plurality of object classes, meaning that each pixels may be given a plurality of confidence scores. Depending on algorithm that is used in the segmentation 203, the format of the output, i.e. how the confidence scores are represented, may vary. In this application, the term tensor represents any output from segmentation algorithm which may be used for the purpose of the invention. The tensor represents one or more confidence scores per pixel in the image, wherein the confidence scores are given for one or more object classes. Non-limiting examples of object classes include vehicle, human, car, foreground, background, head, and bicycle. Thus, the segmentation algorithm may segment on a general level, for example find individual instances of objects without further determining the type of object, or the segmentation algorithm may segment on a more specific level, for example find individual instances of bicycles and cars.

Returning to the step of thresholding 204, by using the motion vectors that are extracted from the video compression 202, the embodiment provides a way of determining confidence score thresholds for the image in an efficient manner. First, the motion vectors are analysed to determine one or more coherent regions of the image that is under segmentation. The analysis comprises evaluating the motion vectors to identify neighbouring motion vectors, i.e. motion vectors of neighbouring macroblocks, that have similar direction and similar magnitudes, thus defining a coherent region. The identified coherent regions point out image regions which depict scene parts that are moving in a coherent manner, for example a walking person, and the remaining parts of the image is likely to not depict any moving objects. This information is used in the thresholding 204 to guide the process regarding where to put effort on finding confidence score thresholds that provides a precise mask. Specifically, the thresholding 204 applies an iterative search for a suitable confidence score threshold in identified coherent regions since these are more likely than remaining area to depict objects. Less processing is spent on finding confidence score thresholds for the remaining image areas which may be treated as a background region and be assigned a default confidence score threshold or not be processed in the image segmentation at all. Thus, according to one embodiment, the method may assume that there are objects only in coherent regions and therefore not spend any resources on trying to segment, i.e. determine instances of object classes, in image areas outside the coherent regions. In one embodiment, a set of coherent regions identified for an image is pre-processed, before they are used in the thresholding 204. The purpose of the pre-processing is to filter out relevant coherent regions and to discard coherent regions that may have been caused by not relevant objects or movements in the scene. The pre-processing may comprise comparing the set of coherent regions with a set of segmentation masks that is identified by interpreting the tensor using one or more base confidence score thresholds. Different base confidence score thresholds may be used in different regions of the image. The base confidence score thresholds may be predetermined values or may be dynamically adjusted during image capturing. For example, a base confidence score threshold may take the same value as the confidence score threshold that was used for a spatially corresponding image area in a previously captured image, preferably the image captured right before. The set of coherent regions is filtered such that coherent regions that are at least partly overlapping, optionally to an extent above a threshold, with a segmentation mask of the set of segmentation masks are kept, and coherent regions that are not overlapping, or overlapping to an extent below a threshold, are discarded and removed from the set of coherent regions. The remaining coherent regions, which can be called relevant coherent regions, in the set of coherent regions are thereafter used for thresholding 204 as disclosed herein. Even though reference is not made to the term relevant coherent regions in the rest of the description, it is understood that the above disclosed optional pre-processing of coherent regions to filter out relevant coherent regions may be used in any of the disclosed embodiments.

Figure 3A:
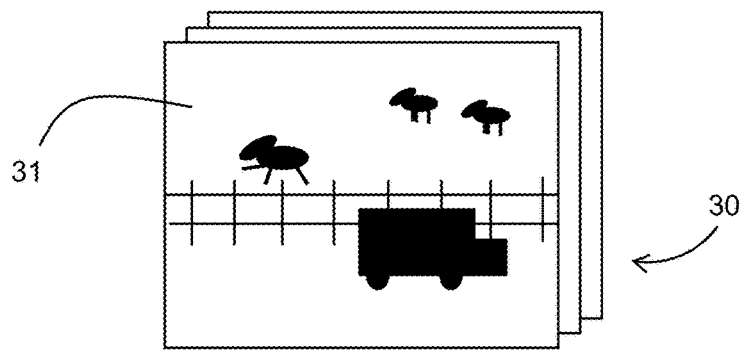
FIG. 3a illustrates a sequence of images.
Figure 3B:
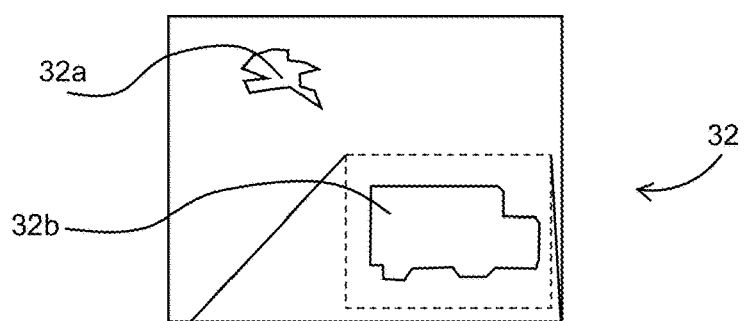
FIG. 3b illustrates coherent region detected in the series of images.
Figure 3C:
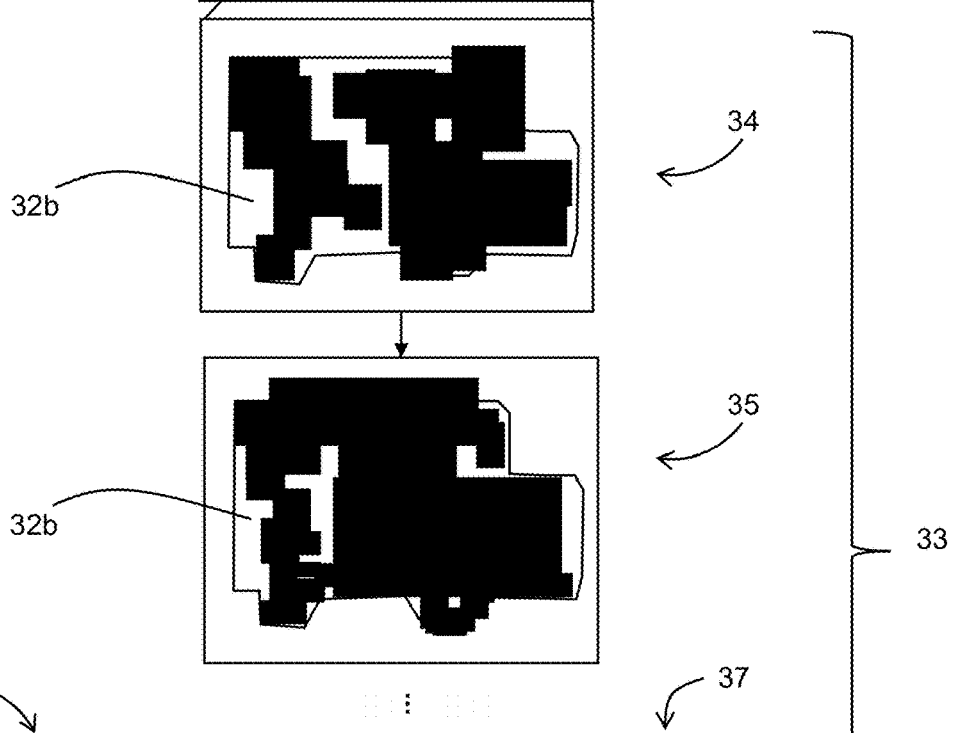
FIG. 3c illustrates a series of temporary segmentation masks.
Figure 3C:
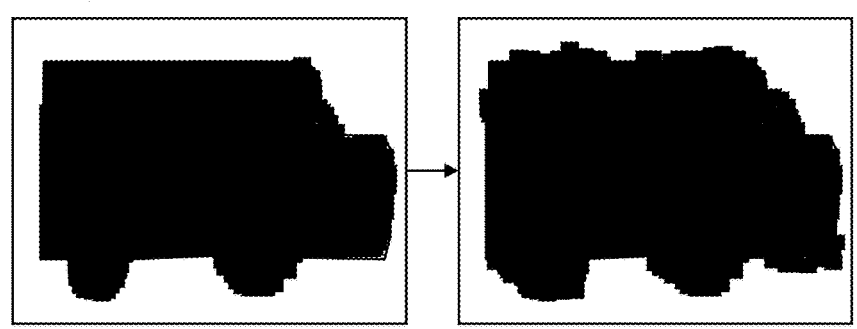

The iterative search for suitable confidence score thresholds in the one or more determined coherent region will now be described in more detail with further reference to FIGS. 3a-3c. FIG. 3a illustrates the image sequence 30 that is obtained in the image capturing 201. An image 31 that is to be segmented depicts a moving car and three creatures. Two of the creatures (to the right) are standing still and one creature (to the left) is moving. During encoding of the image 31, motion vectors are determined that refer to other images in the image sequence 30. As described, the motion vectors determined for the image 31 are analysed to identify coherent regions 32a, 32b which are illustrated in FIG. 3b. Since the coherent regions 32a, 32b are determined on a pixel group level, typically a macroblock level, they provide a rough indication of image areas that depict coherent movement. Although an evaluation of motion vectors is a currently preferred way for determining coherent regions, it should be noted that there exist alternative ways to determine these regions. For example, the coherent regions 32a, 32b may be identified by performing image analysis of the image 31. Known image analysis algorithms for object detection or motion detection may be used for the purpose of finding coherent regions. Another alternative is to use a sensor in addition to the image sensor. The sensor could be, for example, a radar or other distance sensor. Coherent regions may be determined by identifying moving objects by the sensor and determining their corresponding spatial coordinates in the image. Both these alternatives, i.e. determining coherent regions by image analysis or by use of one or more additional sensors, are possible for a skilled person to implement without the need for more details.

For each coherent region, the thresholding 204 generates a series of temporary segmentation masks. FIG. 3c illustrates a series of temporary segmentation masks 33 generated for the coherent region 32b. Each mask in the series of temporary segmentation masks 33 is generated by interpreting the tensor, output from the segmentation 203, using a different temporary confidence score threshold. A black pixel of a segmentation mask indicates that the pixel depicts an object, and form part of the temporary segmentation mask, and a white pixel indicates that the pixel does not depict an object and is not part of the temporary segmentation mask, according to the interpretation of the tensor. The temporary segmentation mask may be generated by interpreting the tensor in the coherent region and, in addition, a surrounding region as illustrated. All black pixels, i.e. all positive interpretations, in the evaluated region is part of the temporary segmentation mask in this context. It is noted that a temporary segmentation mask may consist of separate mask fragments.

The series of temporary segmentation masks 33 are generated per object class, meaning that the tensor is evaluated with respect to a single object class. The series of temporary segmentation masks 33 is in the illustrated embodiment generated for the object class of trucks, meaning that the masks are generated by interpreting the confidence scores for the object class trucks in the tensor. A first temporary segmentation mask 34 is generated using a first, initial, temporary confidence score threshold. A second temporary segmentation mask 35 is generated using a second temporary confidence score threshold that lower the threshold for interpreting a confidence score as positive detection. An N:th temporary segmentation mask 36 is generated using a N:th temporary confidence score that has been lowered further. An (N+1):th temporary segmentation mask 37 is generated using an (N+1):th temporary confidence score that has been lowered further compared to the N:th temporary confidence score. As indicated in the figure, the series of temporary segmentation masks 33 comprises temporary segmentation masks between the second temporary segmentation mask 35 and the N:th temporary segmentation mask 36.

The temporary confidence score thresholds that are used in the series of temporary segmentation masks 33 follows a decreasing scheme in this embodiment. Thus, for each generated temporary segmentation mask, the confidence score threshold is adjusted to lower the threshold for interpreting a confidence score as positive detection.

In addition to generating the series of temporary segmentation masks 33, the thresholding 204 performs an evaluation of these masks to determine if an object mask condition is met by any of the masks. An object mask condition is a predetermined condition for a segmentation mask to be regarded as representing an object. Thus, by evaluating if any of the temporary segmentation masks 33 fulfills the object mask condition, the assumed presence of an object as indicated by the coherent region can be verified or discarded. The object mask condition defines one or more characteristics of the temporary segmentation masks 33. Non-limiting examples of characteristics include non-fragmented, meaning that the mask is not made up of a plurality of isolated mask fragments, and a smooth mask edge. A smoothness of a mask edge may be given by the curvature of the mask edge. An object mask condition may be defined as a maximum allowed curvature of the mask edge. Alternatively, the object mask condition may be defined as a maximum allowed deviation or difference in curvature for the mask edge. The object mask condition may be object class specific, meaning that the object mask condition for verifying a vehicle can be different from an object mask condition for verifying a creature.

The series of temporary segmentation masks 33 may be evaluated during the generation of the series, or when the complete series has been generated. In addition, the series of temporary segmentation masks may be evaluated on an individual level or on a group level. For example, in the illustrated embodiment each mask 34, 35, 36, 37 in series of temporary segmentation masks 33 may be evaluated individually to determine if any of them has a smooth mask edge as defined by an object mask condition defined for the object class of trucks. Alternatively, the masks 34, 35, 36, 37 may be evaluated to determine if the masks 34, 35, 36, 37 is composed of separate fragments which merge into a merged mask throughout a part or the whole series 33. An example of merging fragments is provided in FIG. 3c where the first temporary segmentation mask 34 comprises isolated fragments and the second, later generated, temporary segmentation mask 35 comprises less fragments compared to the earlier generated mask 34. The object mask condition may in this example comprise a detection of merging fragments, i.e. decreasing number of fragments, in the series of temporary segmentation masks 33 between masks where the temporary confidence score thresholds have been adjusted to lower the threshold for a positive detection. In yet another alternative, the masks 34, 35, 36, 36 may be evaluated to find the best fit to an object mask condition. For example, the N:th mask 36 may be found to have the maximum best fit to a mask object condition defined by a smooth mask edge compared to a previous mask and the following (N+1):th mask 37. Thus, the evaluation may be described as finding an optimum for a fulfillment of the object mask condition.

When the coherent region 32b has been evaluated with respect to the object mask condition, a final confidence score threshold for pixels of the coherent region 32b, or for a subset of pixels or macroblocks, therein is set. If the evaluation of the temporary segmentation masks is successful, and thus a mask is found to fulfill or meet the object mask condition, the final confidence score threshold is set to the temporary confidence score threshold of the mask that fulfills the object mask condition. The final confidence score threshold is in that case set for the pixels of the temporary segmentation mask that fulfills the object mask condition. If more than one temporary segmentation mask is found that fulfill the object mask condition, a selection of which temporary segmentation mask and corresponding temporary confidence score threshold must be made. The selection may comprise determining and selecting the mask that fulfills the object mask condition the best, or the mask that is generated with a temporary confidence score threshold that represents a lowest threshold for positive detection.

However, if the object mask condition is not met by any one of the temporary segmentation masks, the final confidence score threshold is set to a default confidence score threshold. The default confidence score threshold can be a predetermined fixed threshold or be the same threshold as determined in segmentation of the coherent region in a previous, preferably immediately preceding, image. The predetermined fixed threshold may be the same as for pixels or a surrounding region to the coherent region.

As exemplified, a final confidence score threshold may be temporarily stored to be used in segmentation of later images. The final confidence score threshold for a first image may be used as an initial temporary confidence score threshold in segmentation of a second, later acquired, image. In another embodiment, the final confidence score is applied in an image region, corresponding to the coherent region of the first image, in the second image even if a coherent region is not determined in that image region. Thus, an object that is in movement in the first image, and identified by the coherent region, can be well segmented even though it the object does not move in the second image, and therefor does not cause a detection of a coherent region.

In yet another embodiment, the final confidence score threshold for a first coherent region of a first image is used when segmenting a second, later, image where a second coherent region is detected. In this embodiment, it is evaluated if the first and second coherent regions are caused by the same object. The evaluation may include analysing similarities in the motion vectors of the coherent region, analysing the spatial relationship between the coherent region, or by utilizing a separate tracking algorithm, for example a multi-object tracking algorithm, that determines and keeps track of individual objects in the images. By determining if there are objects in the coherent regions that have the same identity, according to the tracking algorithm, it may be determined that the coherent regions are caused by the same object. Upon determining that this is the case, by any of the exemplified or other evaluation methods, the final confidence score threshold set for the coherent region, or for a subset of pixels therein, of the first image may be used as an initial confidence score threshold used when generating the first temporary segmentation mask for the coherent region of the second image. An advantage with this embodiment is that the temporary segmentation masks for the coherent region of the second image may fulfill the object mask condition faster by starting the generation of temporary segmentation masks by generating a mask that has already been found suitable for the depicted object.

The process of finding a suitable final confidence score threshold is performed for all coherent regions 32a, 32b that are determined in the image 31. The process can also be performed a plurality of times for a single coherent region 32a, 32b with respect to different object classes in order to determine a suitable final confidence score threshold for each object class. The final confidence score thresholds for different image areas and different object classes are provided for mask composition 205 with the purpose of generating a final segmentation mask for the image 31. The mask composition 205 performs mask composition for the whole image, not only for the coherent regions. For image regions outside the coherent regions, segmentation may be performed by interpreting the tensor using confidence score thresholds that are set as standard or based on, for example, thresholds used in a previous image. The mask composition 205 functions according to known principles for generating the final segmentation outcome. Different known algorithms and conditions may be applied for selecting, based on the received final thresholds, which object class that an image area is most likely to depict. Moreover, setting a spatial boundary between segmentation masks of different object classes can also be a task for the mask composition 205. Thus, according to known methods and based on the final confidence score thresholds and the tensor, the final segmentation outcome is determined and provided for output composition 206. The output composition 206 also receives the encoded image data from the video compression 202 and composes an output from the image processing of the camera 10. The output format of the encoded image data and the final segmentation mask follows conventional standard. For example, the encoded image data may be sent in the form of a video stream from the camera 10 and the final segmentation mask may be sent as metadata.

Figure 4:
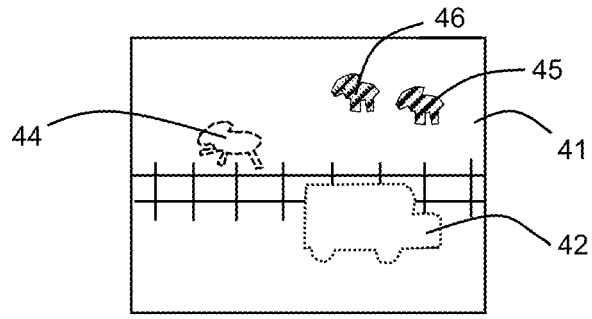
FIG. 4 illustrates a final segmentation outcome.

FIG. 4 illustrates an example of a composed image 41 with a final segmentation outcome comprising a first segmentation mask 44, representing the moving creature of the image 31, and a second segmentation mask 42, representing the moving vehicle of the image 31. The first and second segmentation masks 44, 42 are determined by using the method as disclosed herein, i.e. by iteratively determining temporary segmentation mask to find a suitable confidence score thresholding to use. The final segmentation outcome also comprises segmentation masks 45, 46 that are determined through segmentation by interpreting the tensor with a standard or base confidence score threshold.

Figure 5:
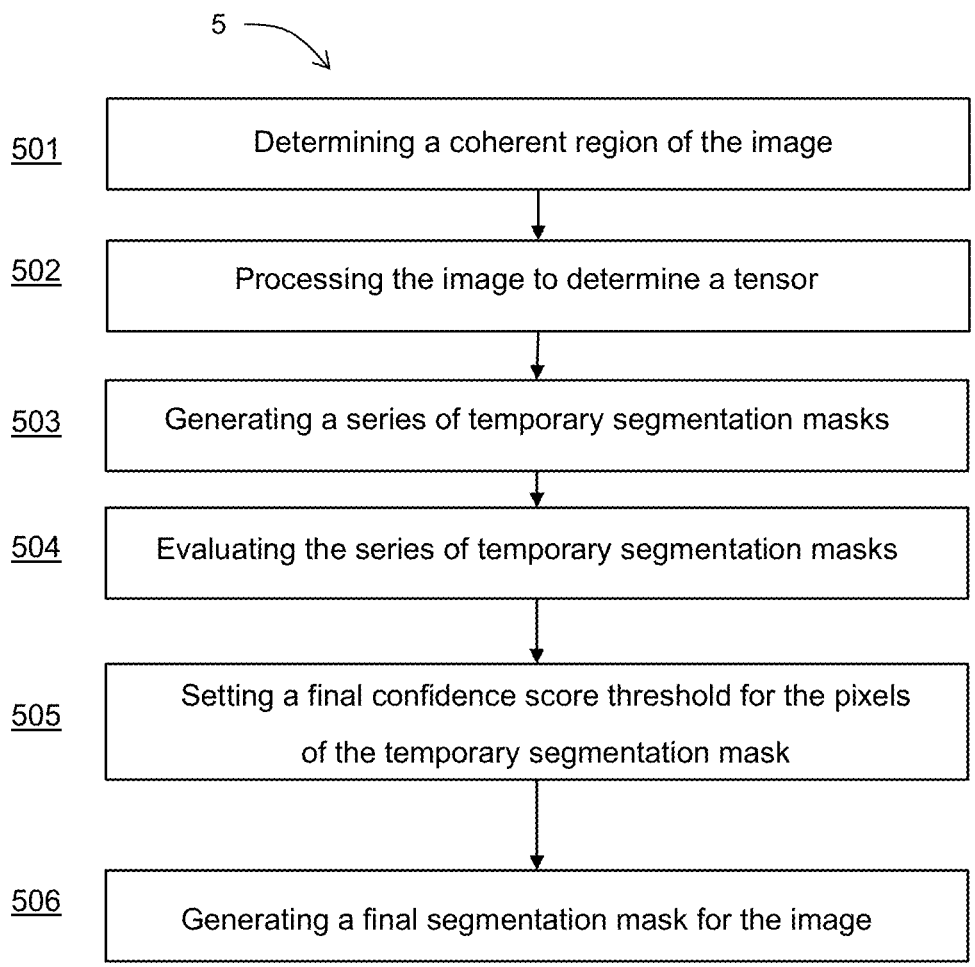
FIG. 5 is a flow chart for a method according to an embodiment of the invention.

FIG. 5 provides a general overview of a method 5 for generating a final segmentation outcome for an image according to an embodiment, wherein each step of the method 5 has been discussed and exemplified above.

The image, i.e. image data of the image, is processed 501 to determine a coherent region. The coherent region can be determined, for example, in the encoder process (in an encoder processor) or in the segmentation process (in a segmentation processor). The image is also processed 502 to determine a tensor representing pixel-specific confidence scores for one or more object classes. The steps 501 and 502 may be performed in parallel or in series. It is not important that any of the steps 501 and 502 is performed before the other. The thresholding in the image segmentation process is performed when both steps 501 and 502 have been performed, i.e. when both the coherent region and the tensor that are needed for the thresholding are available for the thresholding. If one of the steps 501 and 502 is finished before the other, the result of the first finished step can be locally stored, for example in a memory of the camera, and retrieved by the segmentation processor when the result of the second finished step is available. Next, the method 5 comprises a step of generating 503 a series of temporary segmentation masks for each of the one or more coherent regions. As discussed earlier, the one or more coherent regions that are determined in step 501 may have been processed to filter out relevant coherent regions. In that case, the step of generating 503 a series of temporary segmentation masks is performed for each of the one or more relevant coherent regions.

The series of temporary segmentation masks are evaluated 504 according to discussed approaches. The method 5 further comprises setting 505, based on the outcome of the evaluating 504, a final confidence score threshold for the pixels of the temporary segmentation mask or for the coherent region. In the case of several coherent regions, a final confidence score threshold is set for each area. In addition, one or more final confidence score thresholds can be set for pixels of the remaining image area that is not part of any coherent region. The method 5 thereafter comprises generating 506 a final segmentation outcome for the image based on the one or more final confidence scores. As discussed, the generation of the final segmentation outcome may include known methods for evaluating segmentation masks of different object classes for selecting which segmentation masks the final segmentation outcome should include.

The invention claimed is:

1. A method of generating a segmentation outcome which indicates individual instances of one or more object classes for an image in a sequence of images, the method comprising:
   a. determining a coherent region of the image,
   b. processing the image to determine a tensor representing pixel-specific confidence scores for one or more object classes,
   c. generating a series of temporary segmentation masks for the coherent region, wherein each temporary segmentation mask is generated by interpreting the tensor with respect to a single object class using a different temporary confidence score threshold,
   d. evaluating the series of temporary segmentation masks to determine if an object mask condition is met by one or more of the temporary segmentation masks,
   e. in case the object mask condition is met by one or more of the temporary segmentation masks, setting the temporary confidence score threshold used for generating one of the one or more temporary segmentation masks as a final confidence score threshold for the pixels of the temporary segmentation mask,
   f. in case the object mask condition is not met, setting a default confidence score threshold as a final confidence score threshold for the coherent region,
   g. generating a final segmentation outcome for the image, wherein a part of the final segmentation outcome covering the coherent region is generated by interpreting the tensor using the final confidence score threshold.

2. The method according to claim 1, wherein step a comprises determining an image region of neighbouring pixels or pixel groups having motion vectors of approximately the same direction and approximately the same magnitude.

3. The method according to claim 2, wherein step a comprises processing the image by an encoding algorithm to determine motion vectors for pixel groups.

4. The method according to claim 1, wherein the object mask condition comprises at least one of:
   a condition that the temporary segmentation mask defines a non-fragmented object, and
   a condition that temporary segmentation mask fragments merge.

5. The method according to claim 1, wherein step b comprises processing the image by a deep learning model.

6. The method according to claim 1, wherein the series of temporary segmentation masks is generated by iteratively interpreting the tensor using a temporary confidence score threshold that is always increased or always decreased between iterations.

7. The method according to claim 6, further comprising determining if a first temporary segmentation mask, generated using an initial confidence score threshold, is larger or smaller than the coherent region, and,
   selecting to always increase or always decrease dependent on the first temporary segmentation mask being larger or smaller than the coherent region.

8. The method according to claim 1, wherein the single object class is selected by identifying the object class having the highest sum of confidence scores for the pixels in the coherent region.

9. The method according to claim 1, wherein step a comprises generating the series of temporary segmentation masks for an image region consisting of the coherent region and a surrounding margin area.

10. A method of generating segmentation masks which indicates individual instances of one or more object classes for images in a sequence of images, the method comprising:
    performing the method according to claim 1 for a first image,
    determining a coherent region in a second image,
    evaluating if the coherent region of the second image is caused by the same object as the coherent region of the first image,
    performing steps b-g of claim 1 for the second image, wherein a final confidence score threshold for the coherent region of the first image is used for generating a first temporary segmentation mask in the series of temporary segmentation masks if the coherent region of the first and second images are caused by the same object.

11. The method according to claim 10, wherein the step of evaluating if the coherent region of the second image is caused by the same object as the coherent region of the first image comprises processing the first and second images by a multi-object tracking algorithm.

12. The method according to claim 1, wherein the method is performed in a processing device of a camera.

13. An image capturing device configured to generate a segmentation outcome which indicates individual instances of one or more object classes for an image in a sequence of images, the image capturing device comprising:
  one or more image sensors and an image processor configured to acquire the sequence of image,
  an encoder, and
  a processor adapted to perform the method according to claim 1.

14. A non-transitory computer-readable storage medium comprising computer code which when loaded and executed by one or more processors or control circuitry causes the one or more processors or control circuitry to perform a method according to claim 1.

* * * * *